Aug. 30, 1960
E. F. FOX
2,950,579
AUTOMATIC MACHINE FOR CUTTING HYPODERMIC
NEEDLES FROM STEEL TUBES
Filed Oct. 7, 1957
3 Sheets-Sheet 3
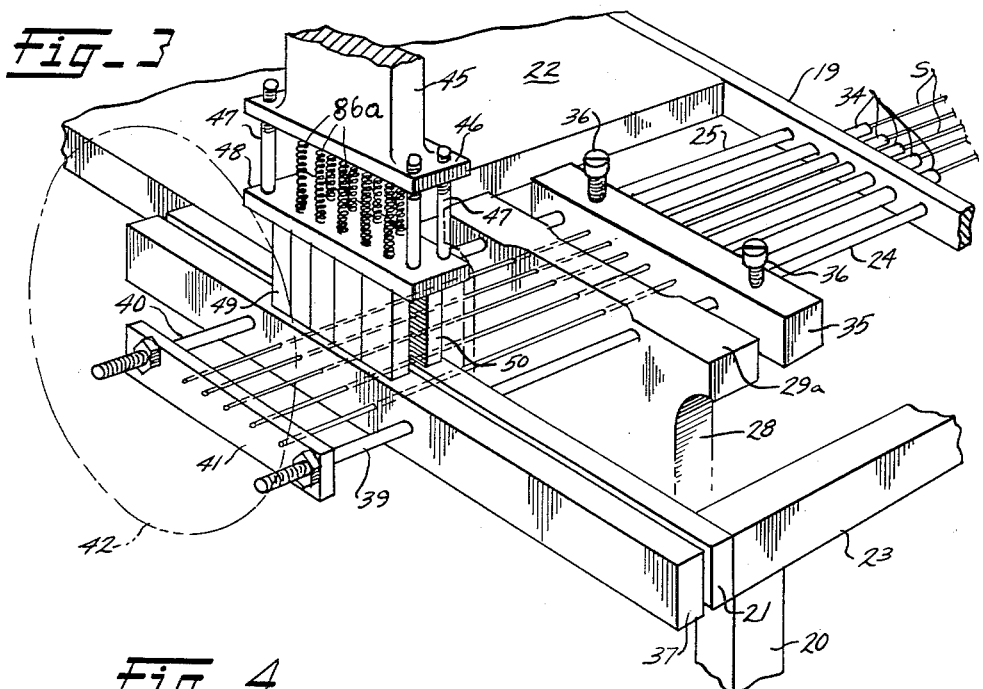
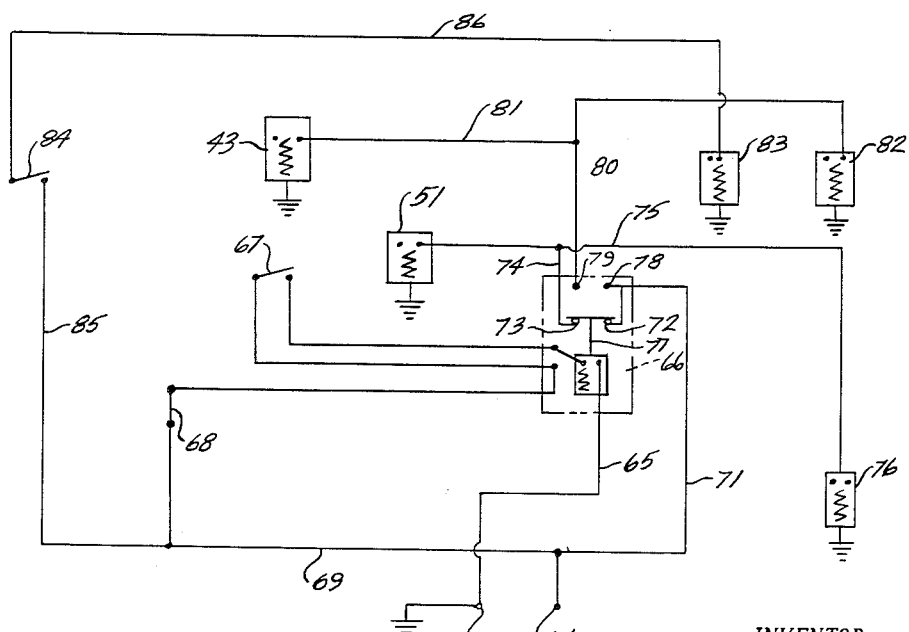
INVENTOR.
ERVIN F. FOX
BY
H. G. Manning
ATTORNEY

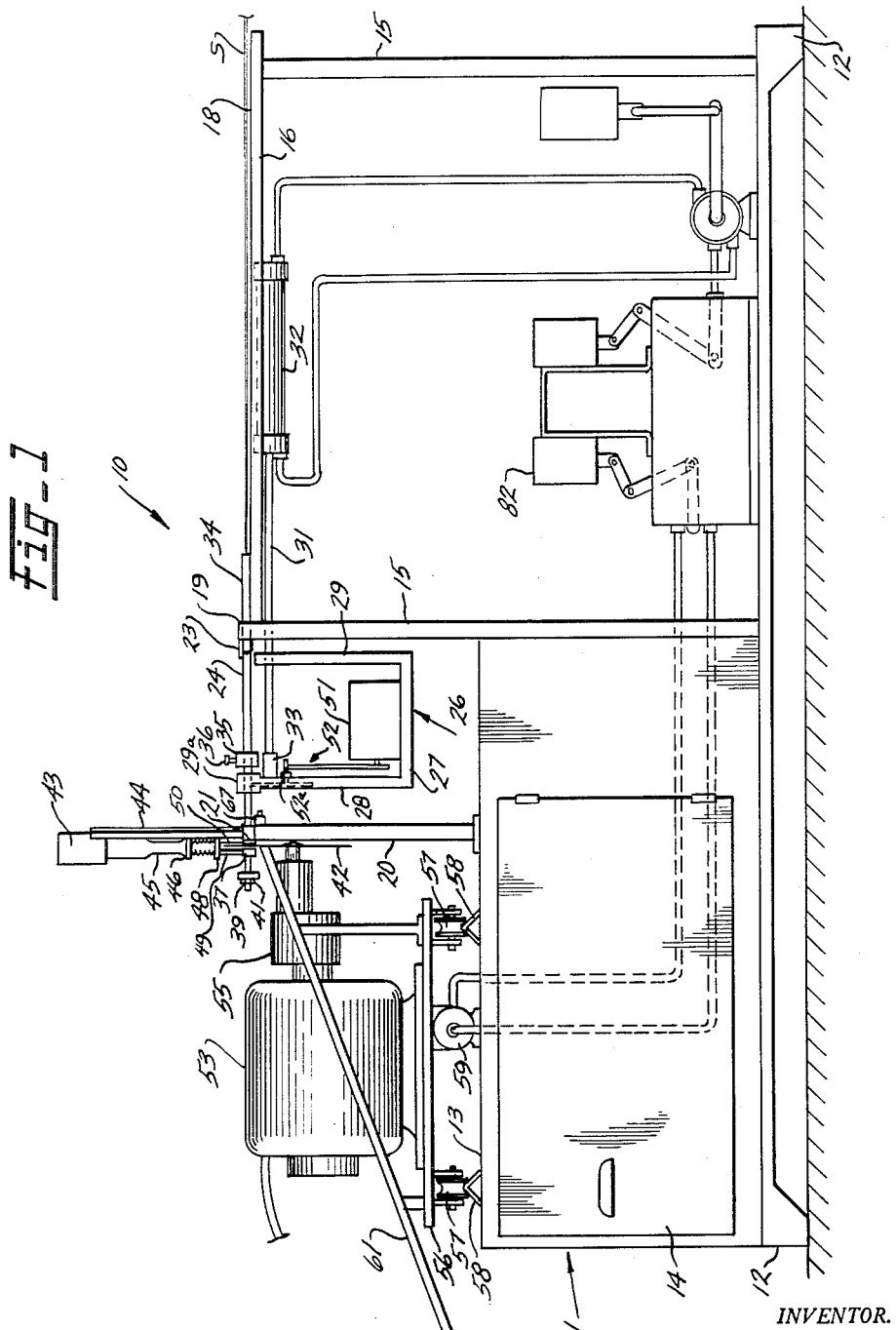

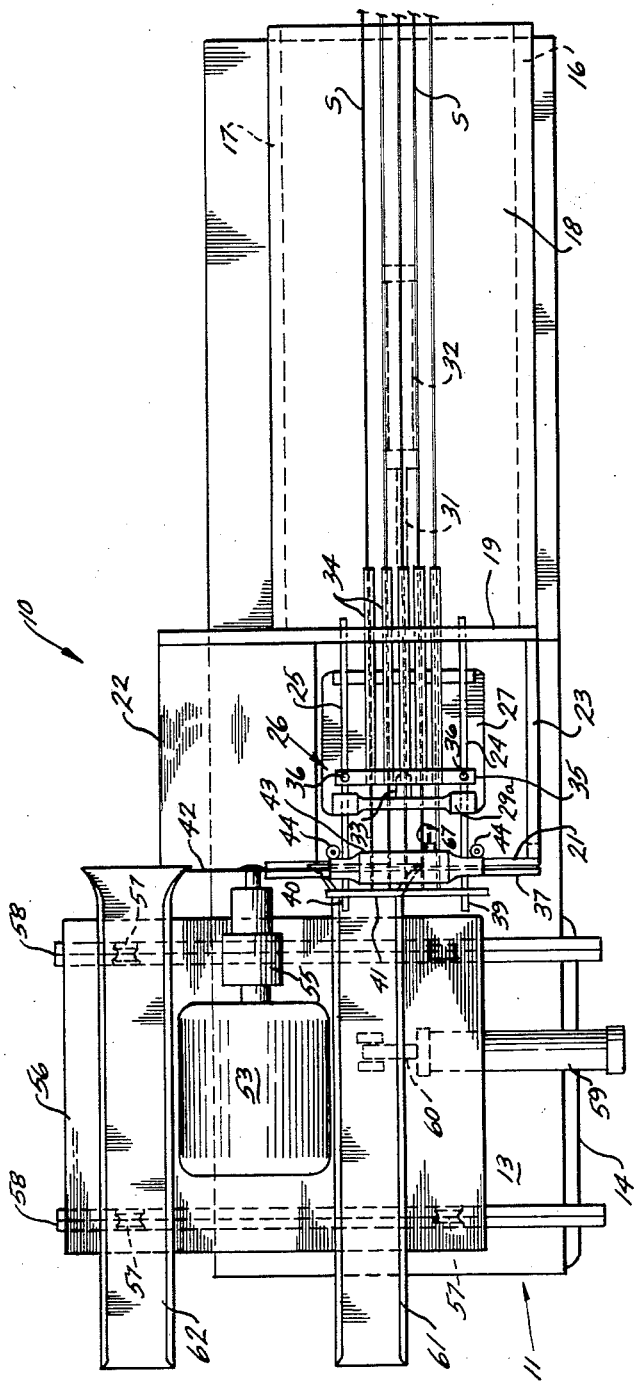

United States Patent Office

2,950,579
Patented Aug. 30, 1960

2,950,579

AUTOMATIC MACHINE FOR CUTTING HYPODERMIC NEEDLES FROM STEEL TUBES

Ervin F. Fox, 8 Burton St., Waterbury, Conn.

Filed Oct. 7, 1957, Ser. No. 688,471

3 Claims. (Cl. 51—98)

My invention relates to automatic tube measuring and cutting machines, and is directed particularly to a machine for cutting hypodermic needles from small diameter steel tubes.

The principal object of my invention is to provide a machine of the above nature which will automatically cut long lengths of small diameter steel tubing into predetermined short lengths for use as hypodermic needles.

Another object of my invention is to provide an automatic machine of the above nature which will produce hypodermic needles at high speed and requiring little attention other than that needed to feed tubing stock into the machine from time to time.

A more particular object of my invention is to provide a machine of the character described having means to intermittently and simultaneously advance a plurality of lengths of tubing stock to be cut in a longitudinal direction by a given predetermined distance, and having transversely movable cutting means operating in timed relation with the tube advancing means for periodically cutting off the lengths of tubing.

Other objects, features and advantages of the invention will be apparent from the following description when read with reference to the accompanying drawings wherein:

Fig. 1 is a front elevational view of an automatic machine for cutting hypodermic needles from small diameter steel tubes, according to the invention, Fig. 2 is a top view of the machine shown in Fig. 1, Fig. 3 is a partial perspective view of the tube gripping and advancing mechanisms employed in the machine shown in Figs. 1 and 2, and Fig. 4 is an electrical schematic diagram of the control system of the machine.

Referring now in detail to the drawings, wherein like reference numerals denote corresponding parts throughout the several views, the numeral 10 designates, in general, an automatic machine embodying the invention, the same comprising a rectangular support structure 11 resting on four short legs 12 (only two shown). The left side of the support structure 11 (see Fig. 1) is of box-like form and has a flat table 13 for supporting a cutter head mechanism, which will hereinafter be described.

A side opening door 14 is hinged near the front of the support structure 11 below the flat table 13 for enclosing a space for storage of spare parts, etc.

Supported on four upstanding posts 15 (two of which are shown in Fig. 1) are a pair of parallel longitudinal horizontal angle iron support members 16 and 17, respectively, upon which a rectangular horizontal flat tubing stock table 18 is secured. The stock table 18 is parallel with and substantially elevated from the cutter head mechanism supporting table 13.

A horizontal cross bar 19 is secured across the top of the left-hand end of the stock table 18.

Supported above the table 13, by means of front and back upstanding legs 20 (Figs. 1 and 3) is a cross support bar 21, located at substantially the same level as the cross bar 19. A flat rectangular table 22 is supported above the rear end portions of the cross bars 19 and 21, which bars are connected by a longitudinal brace member 23.

Fixed between the cross bars 19 and 21 are a pair of spaced parallel longitudinal guide rods 24, 25 and supported for reciprocating sliding motion below said guide rods 24, 25, is a carriage 26, comprising a base 27 and a forward end wall 28.

Secured along the top of the forward end wall 28 of the carriage 26 is a horizontal transverse member 29a having spaced guide openings for loosely receiving the horizontal guide rods 24, 25.

The carriage 26 is also provided with a back wall 29 having a central opening, through which extends a piston rod 31 (Fig. 1) of a double-acting air cylinder actuator 32 fixed with respect to the support structure 11 below the tubing stock table 18. The outer end of the piston rod 31 is secured to a plunger 33 which is secured to the forward end wall 28 of the carriage 26. It will thus be seen that actuation of the air cylinder 32 will cause the carriage 26 to reciprocate along the horizontal guide rods 24, 25, for a purpose hereinafter described.

Secured in spaced parallel relation in the cross bar 19 between the horizontal guide rods 24, 25 are a plurality of longitudinal tubular guides 34 which are seated at their front ends in openings in a lateral support bar 35, slidably arranged on said guide rods. The support bar 35 is provided with vertical set screws 36 for securing said bar to the guide rods 24, 25 in adjusted positions.

A plurality of small diameter steel tubings S, which preferably are in the form of 6 or 8 foot pre-cut lengths for easy handling, are fed through the tubular guides 34, and through the spaced guide openings in the transverse member 29a which is provided with gripping means, hereinbelow described, for moving the tubings S with the carriage 26 when the latter is actuated by the piston 31 in the air cylinder 32.

Fixed to the front of the support cross bar 21 in slightly spaced relation therefrom is a horizontal bar 37, extending forwardly from which are a pair of parallel rods 39, 40, along which is supported an adjustable transverse abutment bar 41 (Fig. 3).

The front ends of the tubings S extend through openings in the lateral support bar 21 and the front bar 37 and abut against the inside vertical surface of the bar 41 upon movement of the carriage 26 into its forward position when actuated by the piston rod 31.

The space between the bars 21 and 37 serves as a guide channel for the lateral reciprocation, periodically, of a rotary abrasive cut-off disc 42 carried by the cutter mechanism to be described later.

In order to support firmly the forward ends of the tubings S while the hypodermic needles are being cut off therefrom, provision is made of magnetic gripping means comprising an elevated vertical solenoid 43, supported above the bars 21 and 37 by a pair of vertical rods 44 (Fig. 1). The armature of the solenoid 43 is secured to a depending actuating bar 45, the lower end of which is formed with a horizontal flange 46. Slidably supported on four corner bolts 47 secured to the flange 46 is a lower movable horizontal plate 48.

Supported on the underside of the plate 48 are a plurality of pairs of spring pressed spaced apart push bars 49, 50 (Fig. 3), located in alignment with one of the through openings for the stock pieces S in the bars 21 and 37. The push bars 49, 50 are adapted to be pressed downwardly upon the stock tubes S with a resilient force due to a plurality of springs 86ª, when the solenoid 43 is in deenergized condition.

The gripping means of the transverse member 29a of the carriage 26 is similar to the above-described magnetic gripping means for holding the forward ends of the tubing S, while the hypodermic needles are being cut off, and comprises a horizontal solenoid 51 and a spring-actuated mechanism generally designated by the reference numeral 52. In order to automatically release the gripping action on the stock S when the solenoid 51 is actuated, provision is made of a microswitch 52a located in the path of the end wall 28 of the carriage 26.

Cutting mechanism

The mechanism for cutting off the lengths of stock S, for use as hypodermic needles, comprises an electric cutter head motor 53 which serves to rotate the abrasive disc cutter 42 through a speed reducing unit 55. The motor 53 is supported on a base plate 56 (Fig. 1), which is equipped on its underside with spaced grooved rollers 57 to allow transverse movement of said base plate 56 on a pair of inverted V-shaped tracks 58 secured to the supporting table 13.

The above-described cutting mechanism is so arranged that the cutter disc 42 is located between the spaced lateral bars 21 and 37. Lateral movement of the cutter disc 42 will be effected by means of air pressure in a cylinder 59 (Fig. 2), fixed to the supporting table 13, upon a piston 60 attached to the underside of the slidable base plate 56.

A pair of inclined chutes 61, 62 (Figs. 1 and 2) are arranged at each side of the cutter head motor 53 for conveying the cut-off pieces of stock S by gravity, after they have been released by the associated gripping means. It will be apparent that a complete cutting operation is effected during each back and forth pass of the cutter head mechanism.

Electrical control system

Referring to Fig. 4, a source of electrical energy is supplied by a pair of input terminals 63 and 64. The terminal 63 is connected by a wire 65 to one terminal of the energization coil of a single-pole double-throw magnetic switch or relay 66. The other terminal of the energization coil of the relay 66 is connected in series through a microswitch 67 and a single pole single throw switch 68 through a wire 69 to the remaining input terminal 64. The input terminal 63 is grounded as indicated at 70.

The microswitch 67 is normally open-circuited, as illustrated in Fig. 4, when the machine is set into operation, so that the relay 66 will then be de-energized. Electrical connection will thus be made from the input terminal 64, through wire 71 (now closed-circuited relay switch contacts 72 and 73 of the relay 66), and wires 74 and 75, to simultaneously energize the gripping mechanism solenoid 51 and a forward motion solenoid 76.

Energization of the gripping mechanism solenoid 51 serves to grip the forward ends of the stock S in the transverse member 29a, as hereinabove described, while energization of the forward motion solenoid 76 serves to control an air valve (not illustrated) to supply pressure to the double-acting air cylinder 32, thereby pushing the piston rod 31 forward and moving the carriage 26, together with the gripped plurality of needle stocks S, forwardly.

The stock tubes S will be carried forward until the front ends thereof strike the preset abutment bar 41, and the pieces next to be cut off will thus be accurately measured. At this time, of course, the gripping mechanism associated with the lateral bars 21 and 37 through which the front ends of the stock S pass, is inoperative.

The microswitch 67 is mounted near the upstanding legs 20 in such a position as to be engaged by the carriage 26 when it has moved to its foremost position along the horizontal guide rods 24, 25. This will close the microswitch 67 and energize the relay 66. The armature 77 will thus move upwardly to open the contacts 72 and 73, and close the contacts 78 and 79 of the relay 66.

The solenoids 51 and 76 will thereby be de-energized, causing the forward motion of the carriage 26 to stop, and the grip on the stock S will be released. At the same time, the solenoid 43 associated with the lateral bars 21 and 37 will be energized to grip the stock prior to cutting it off as hereinabove described.

This energization of the solenoid 43 is effected by the circuit from the source terminal 64, through wire 71, now short-circuited relay terminals 78, 79, wires 80 and 81, and through said solenoid energization winding to the ground 70. At the same time, the energization of a cutter head solenoid 82 will be effected through the wire 80.

The cutter head solenoid 82 will actuate a valve which controls the air pressure supplied to the double-acting air cylinder 59, causing it to move from one end position to the other, whereby the continuously rotating cut-off disc 42 will be caused to move laterally between the lateral bars 21 and 37 and cut off the forwardly-projecting predetermined short lengths from the tubing stock S.

In order to effect reversal of the direction of movement of the cutter head mechanism in successive cycles of operation, provision is made of a solenoid 83 energized through a microswitch 84 and adapted to be actuated by the base plate 56 of the cutter head mechanism.

The solenoid 83 is energized from the source terminal 64 through wires 69, 85 and 86 connected in series with the microswitch 84, and said solenoid is grounded. The solenoid 83 controls a valve mechanism (not shown) which automatically reverses the action of the double-acting air cylinder 59 at the end of each stroke. Also, at the end of each stroke of the cutter head mechanism, the switch 68 will be automatically actuated, so that the relays 66 and the solenoids 51 and 76 will be de-energized. At the same time, energization of the solenoid 76 will cause the double-acting cylinder 32 to return the carriage 26 to its starting position again automatically, thus completing a cycle of operation.

This operation will be continuous, and need be interrupted only to feed new needle stock tubes S into the machine. It will be apparent that after the completion of a cutting pass by the rotary disc cutter 42, release of the gripping mechanism associated with the lateral bars 21 and 37 will be automatically effected, whereby the cut-off ends of the stock S will be free to slide down one or the other of the inclined chutes 61, 62.

While only one form in which the invention may be embodied in practice is described in this specification, it is to be understood that this form is given by way of illustration only, and that the invention is not limited to the particular disclosure, but may be embodied in various other equivalent forms without departing from its spirit. In short, the invention includes all the modifications and embodiments coming within the scope of the following claims.

What is claimed as new and for which it is desired to obtain Letters Patent is:

1. In a machine for automatically cutting short pieces of predetermined length from long pieces of small diameter tubing, the combination comprising a supporting framework, carriage mechanism comprising means to simultaneously move a plurality of pieces of tubing from one position to another by a measured amount, means to thereafter hold said pieces in said other position, a cutting mechanism, means for reciprocating said cutting mechanism in a direction prependicular to the direction of movement of said carriage mechanism, said cutting mechanism, comprising a rotating cutting disc positioned to cut off the end portions from said pieces of tubing, means to automatically release said holding means at the end of said cutting operation to allow the cut pieces of tubing to drop out of said machine, said holding means comprising a pair of spaced lateral bars fixed with respect to said framework and having aligned openings through which said end portions extend, and solenoid-controlled means for clamping said end portions in said lateral bars.

2. In a machine for automatically cutting short pieces from long lengths of small diameter tubing, the combination comprising a supporting framework, a carriage mechanism reciprocable from one position to another, said carriage mechanism comprising means to simultaneously move the ends of said pieces of tubing from one position to another by a measured amount, means to hold the end portions of said pieces in fixed position upon their having reached said other position, a cutting mechanism, means for reciprocating said cutting mechanism in a direction perpendicular to the direction of movement of said carriage mechanism, said cutting mechanism comprising a rotating cutting disc positioned to cut off said end portions from said pieces of tubing, means to automatically release said holding means at the end of said cutting operation to allow the cut pieces of tubing to drop out of said machine, said holding means comprising a pair of spaced lateral bars fixed with respect to said framework and having aligned openings through which said end portions extend, and solenoid-controlled means for clamping said end portions in said lateral bars, said cutting disc extending between said lateral bars.

3. In a machine for automatically cutting short pieces from long lengths of small diameter tubing, the combination comprising a supporting framework, a carriage reciprocable from one position to another with respect to said framework, said carriage mechanism comprising means to simultaneously move said pieces of tubing from one position to another by a measured amount, means to hold the end portions of said pieces in fixed position upon their having reached said other position, a cutting mechanism, means for reciprocating said cutting mechanism along a direction perpendicular to the direction of movement of said carriage mechanism, said cutting mechanism comprising a rotating cutting disc positioned to cut off said end portions from the remainder of their tubing lengths after movement of said cutting mechanism from one of said end positions to another, means to automatically release said holding means at the end of a cutting operation to allow the cut pieces of tubing to drop out of said machine, said end portion holding means comprising a pair of spaced lateral bars fixed with respect to said framework, and having aligned openings through which said end portions extend, and solenoid-controlled means for clamping said end portions, said cutting disc being disposed between said lateral bars, and a pair of downwardly inclined chutes arranged at each side of said cutting disc for receiving the cut-off pieces of tubing upon release of said holding means.

References Cited in the file of this patent

UNITED STATES PATENTS

| 407,523 | Greg | July 23, 1889 |
| 2,693,057 | Eastwood | Nov. 2, 1954 |